(No Model.)
E. H. EISENHART.
ART OF MANUFACTURING FILLING FOR RAG CARPETS.
No. 325,242. Patented Sept. 1, 1885.
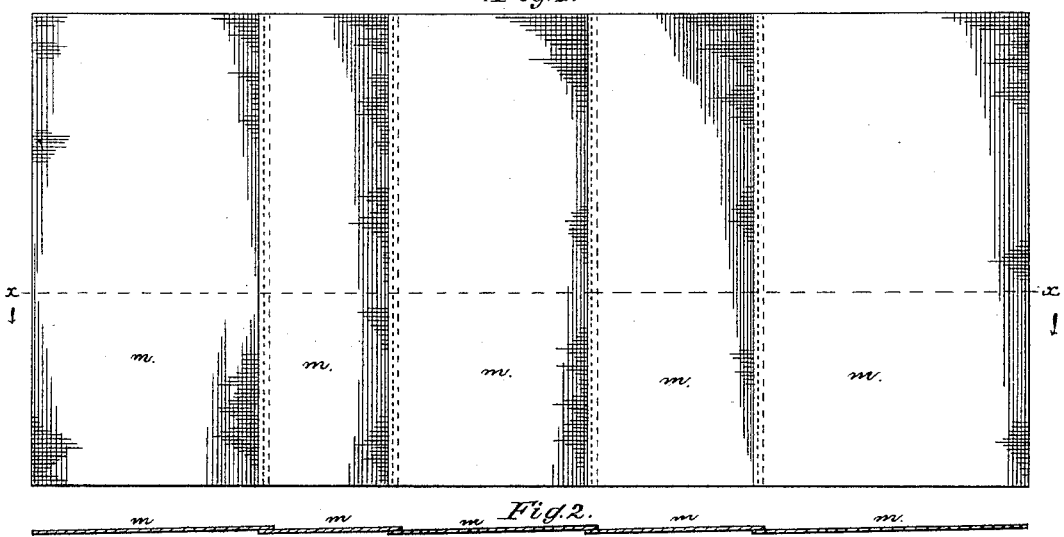
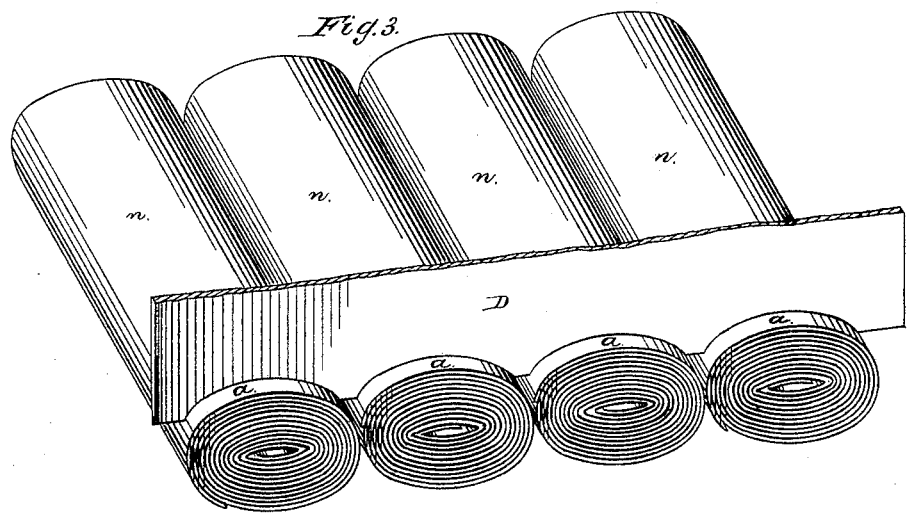
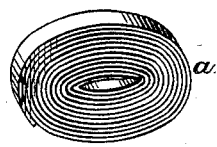
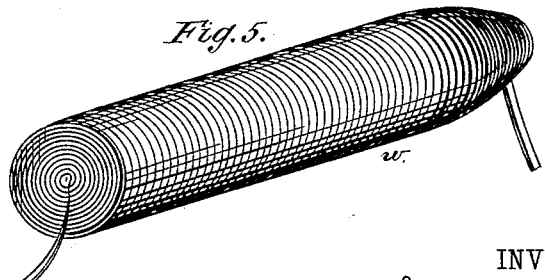
WITNESSES:
Edward Wolff
Herman Gustow
INVENTOR
Edward H. Eisenhart
BY
Chas. C. Gill
ATTORNEY

UNITED STATES PATENT OFFICE.

EDWARD H. EISENHART, OF NEW YORK, N. Y.

ART OF MANUFACTURING FILLING FOR RAG CARPETS.

SPECIFICATION forming part of Letters Patent No. 325,242, dated September 1, 1885.

Application filed October 18, 1883. (No specimens.)

*To all whom it may concern:*

Be it known that I, EDWARD H. EISENHART, a citizen of the United States, and a resident of New York, in the county of New York and State of New York, have invented certain new and useful Improvements in the Art of Manufacturing Filling for Rag Carpets, of which the following is a specification.

The invention consists in an improvement in the art of manufacturing filling to be used in the manufacture of rag carpets.

Heretofore it has been customary in the art to which the invention relates to form the filling for the carpet by cutting or tearing into strips remnants and pieces of muslin and goods of various kinds, then sewing the strips together to form a continuous piece, and winding them upon a spool or into a ball, or otherwise rolling the material together into a compact mass.

It is well understood that heretofore in the manufacture of rag carpets the weaving has been chiefly accomplished by hand, and this has been rendered necessary by reason of the fact that in preparing the strips for the filling they are invariably cut or torn of varying width and very insecurely sewed together, and that it frequently occurs that employés will sew a very narrow strip to one of much greater width. Besides the above, in cutting or tearing the strips according to the methods practiced heretofore, many weak places were formed in the pieces, which necessitated careful handling to prevent breakage and consequent embarrassment. The entire manner of preparing the filling has been such as to render weaving in any other way than by hand impossible.

In practicing my invention I sew remnants of muslin, &c., together at their ends by means of a sewing-machine, the stitches of which will traverse the full width of the goods. In sewing the remnants or pieces together as above specified I alternate the colors as far as practicable, so as to produce a varied effect in the goods. After a sufficient number of pieces or remnants have been sewed together I form them into a compact roll. This may be accomplished by any suitable means—such as a revolving spindle or otherwise. After a number of the rolls have been formed I proceed to form them into strips, such as are required for the filling of the carpet, and in so doing I subject them to a cutting-machine—such as the ordinary paper-cutter—by which they are cut or sliced transversely into sections or pieces of the desired width. I have found it convenient to employ a cutting-machine capable of cutting six, eight, or more of the rolls when the latter are placed side by side.

In the drawings forming a part of this application, Figure 1 is a plan view of a number of remnants (lettered $m$) sewed together to form a continuous piece. Fig. 2 is a sectional view of same on the line $x\ x$. Fig. 3 is a perspective view of a series of rolls (lettered $n$) formed from the pieces shown in Fig. 1, the rolls being in position to be severed into transverse pieces by a cutter, D, as shown, with its edge embedded in the goods. Fig. 4 is a perspective view of one of the pieces severed from the roll by the operation illustrated in Fig. 3, and Fig. 5 is a perspective view of a cop (lettered $w$) made from a suitable number of the pieces shown in Fig. 4.

After the rolls have been cut in the manner stated I wind the sections lettered $a$ upon the usual spools, sewing the last end of the strip forming one section $a$ to the loose end of the strip composing another section until the spool has been filled, after which the spools are taken from the spooling-machine and placed upon the cop-machine, and the material is then formed into cops according to the well-known method of operating these machines. The cops when formed may be placed in the usual shuttle and woven by machinery in the same manner as that employed with regard to the weaving of jute or other filling.

By means of my method of manufacture as above described I produce in a rapid, safe, and economical manner a rag-carpet filling of uniform dimensions, requiring but little hand-sewing and manipulation, and capable of being formed into cops and woven by power machinery.

What I claim as my invention, and desire to secure by Letters Patent, is—

The improvement in the art of manufacturing filling for rag carpets which consists in, first, sewing pieces or remnants of goods together at their ends to form a continuous piece; second, forming said piece into a roll; third, cutting the roll into transverse pieces or slices, and, fourth, winding these transverse pieces into a cop, substantially in the manner and for the purpose described.

Signed at New York, in the county of New York and State of New York, this 10th day of October, A. D. 1883.

EDWARD H. EISENHART.

Witnesses:
HERMAN GUSTOW,
CHAS. C. GILL.